Jan. 10, 1967     H. W. GALER     3,297,072

FASTENING DEVICES

Filed June 16, 1965

INVENTOR
HERBERT W. GALER
BY
    Pringley, Baird, Clayton,
    Miller & Vogel,
                  ATTYS.

3,297,072
FASTENING DEVICES
Herbert W. Galer, Highland, Ind., assignor to General American Transportation Corporation, Chicago, Ill., a corporation of New York
Filed June 16, 1965, Ser. No. 464,343
1 Claim. (Cl. 151—41.73)

The present invention relates to fastening devices, and more particularly to such devices for fastening together an element molded of plastic material and a member formed of any suitable material, such as steel.

In the manufacture of many devices, such as automobile body sections, it is necessary to fasten an element molded of plastic material, such as polyester, polystyrene, polyethylene, etc., to a member, such as a steel support, or the like; and it is extremely difficult to accomplish this result when the plastic material of which the element is molded is either hard and brittle or soft and pliable.

Accordingly, it is a general object of the present invention to provide a fastening device of improved construction and arrangement that is highly satisfactory for the purpose of securing an element molded of plastic material to a member formed of suitable material, wherein the element includes a boss formed integrally therewith and projecting outwardly therefrom, wherein the boss has a substantially cylindrical outer surface and an opening extending axially into the outer end thereof, and wherein the fastening device comprises a metal part anchored to the boss and thus to the element and also anchored to the member.

Another object of the invention is to provide a fastening device of the character described, wherein the metal part is of generally cup-shaped configuration including a substantially tubular side wall and an end wall, the side wall being adapted to surround and frictionally to engage the outer surface of the boss so as securely to anchor the part to the boss and thus to the element, whereby the side wall subjects the boss to radially inwardly directed forces when the part is anchored to the element, and wherein the fastening device further comprises a metal screw disposed in a hole provided in the end wall and arranged generally in alignment with the outer end of the opening when the part is anchored to the element, the screw being in frictional engagement with the end wall and being adapted frictionally to engage the member so as securely to anchor the end wall and thus the part to the member.

A further object of the invention is to provide a fastening device of the character described, wherein the inner end of the screw is adapted to project into the outer end of the opening and out of contact with the surrounding boss when the part is anchored both to the element and to the member, whereby the screw subjects the boss to no radially outwardly directed forces when the part is anchored both to the element and to the member.

Further features of the invention pertain to the particular arrangement of the elements of the fastening device, whereby the above-outlined and additional operating features thereof are attained.

The invention, both as to its organization and method of operation, together with further objects and advantages thereof, will best be understood by reference to the following specification, taken in connection with the accompanying drawing, in which.

Figure 1:
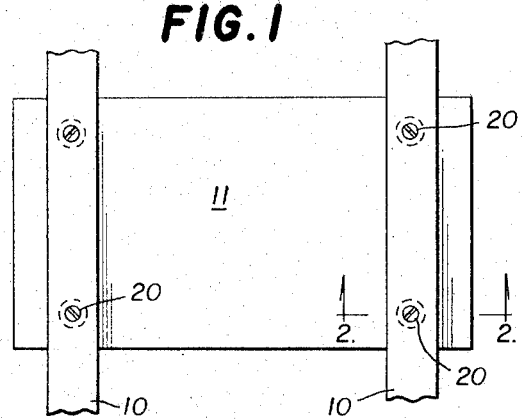
FIGURE 1 is a rear view of an assembly of a pair of supporting members and a molded plastic panel or element, that is secured together by a plurality of fastening devices embodying the present invention.
Figure 4:
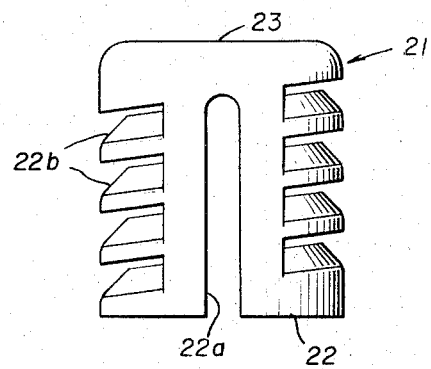
FIG. 4 is a side elevational view of the fastening device.
Figure 2:
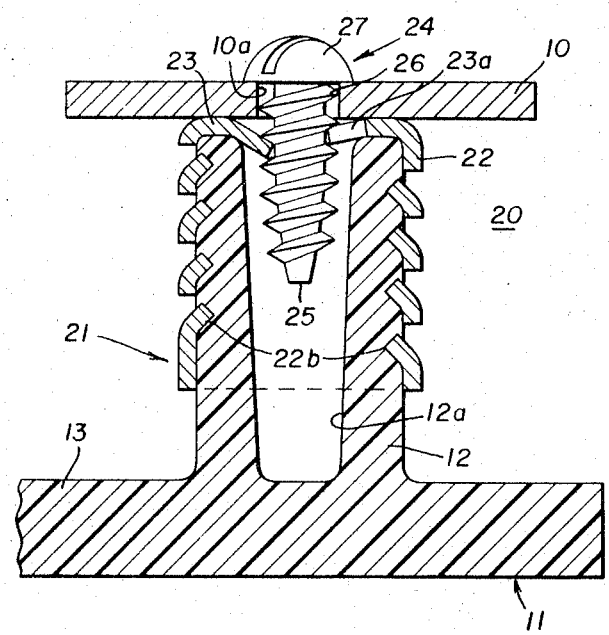
FIG. 2 is an enlarged sectional view of a fragmentary portion of the assembly of FIG. 1, this view being taken in the direction of the arrows along the line 2—2 in FIG. 1.
Figure 5:
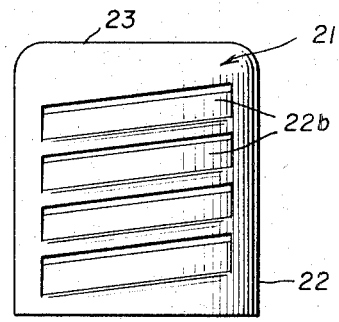
FIG. 5 is another side elevational view of the fastening device.
Figure 3:
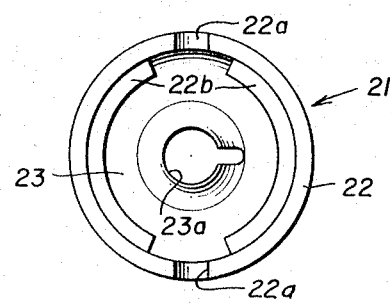
FIG. 3 is a bottom view of the fastening device, as shown in FIG. 2.
Figure 6:
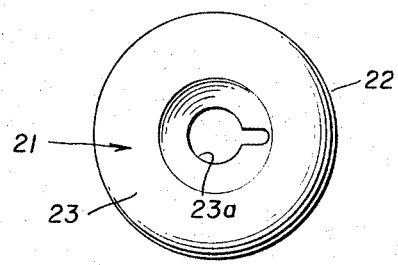
FIG. 6 is a top view of the fastening device.

Referring now to FIG. 1, there is shown an assembly of a pair of supporting members 10 that may be formed of any suitable material, such as steel, and a panel element 11 molded of a plastic material, such as polyester, polystyrene, polyethylene, etc.; which assembly is retained in assembled condition by a plurality of fastening devices 20, each embodying the features of the present invention. As best shown in FIG. 2, a plurality of bosses 12 are molded integrally with the main body 13 of the panel 11; and the panel 11 is secured to the supporting members 10 through the bosses 12 by the fastening devices 20. Each of the bosses 12 is of tubular or cylindrical configuration including a substantially cylindrical side wall and having a substantially centrally disposed and axially extending opening 12a therein, the opening 12a being formed in the boss 12 incident to molding thereof and extending therethrough from the outer open end of the boss 12 substantially to the plane of the adjacent surface of the main body 13 of the panel 11.

Each of the fastening devices 20 comprises a metal body part 21 of generally cup-shaped configuration, including a substantially tubular or cylindrical side wall 22 and an end wall 23. Preferably, the part 21 is produced by a pressing or stamping operation in a well-known manner, and is formed of sheet metal characterized by substantial resiliency, such as cold-rolled steel, brass, etc. In the production of the part 21, a plurality of slots 22a are formed in the side wall 22 so as to produce a plurality of sections thereof; whereby the sections of the side wall 22 may be strained radially outwardly and out of their normal positions of cylindrical symmetry, as shown in FIGS. 2 to 6, inclusive. Also, in the production of the part 21, a plurality of radially inwardly directed projections 22b are formed in the sections of the side wall 22; which projections 22b are arranged in a helically disposed path to provide thread-cutting structure upon the side wall 22. In the end wall 23, a substantially centrally disposed key-shaped hole 23a is formed that is employed for a purpose described below.

Further, the fastening device 20 comprises a screw 24 of the self-tapping type, including a shank 25 carrying a helically disposed thread 26 and terminating at the rear end thereof in an enlarged head 27; which screw 24 may be formed of hardened steel, brass, etc., in a convenient manner.

In the assembly, as shown in FIGS. 1 and 2, the head 27 of the screw 24 is adapted frictionally to engage the adjacent surface of the adjacent supporting member 10, with the shank 25 projecting through a cooperating hole 10a formed in the supporting member 10 and into the opening 12a formed in the adjacent boss 12 and out of contact with the plastic material of which the boss 12 and the panel 11 are molded.

Considering now the mode of assembling the preformed panel 11 upon the supporting members 10, the several parts 21 are first anchored to the respectively corresponding ones of the bosses 12. Specifically, each part 21 is fitted over the outer end of one of the bosses 12 and pressed toward the panel 11 and rotated, thereby to cause the projections 22b to thread the outer end of the outer surface of the boss 12 as it is embraced by the surrounding side wall 22. The slots 22a accommodate some radially outward movement of the sections of the side wall 22 as the threading of the boss 12 proceeds by the projections 22b. When the part 21 is rotated into its final or set position, as shown in FIG. 2, the end wall 23 engages the extreme outer end of the boss 12. The part 21 is securely anchored in place in its final position by virtue of the frictional engagement by the thread-cutting projections 22b with the thread that is cut thereby in the outer cylindrical surface of the boss 12; and the part 21 securely holds the boss 12 with radially inwardly directed forces, so as to reinforce the same, with the result that the boss 12 is actually stronger after placement of the part 21 than it was prior thereto. After all of the parts 21 have been anchored to the respectively corresponding ones of the bosses 12, the panel 11 is positioned against the supporting members 10; and then the screws 24 are projected through the corresponding holes 10a in the supporting members 10 and into the openings 23a in the end walls 23. Finally, the screws 24 are set, so as to draw the end walls 23 firmly into engagement with the adjacent surfaces of the supporting members 10. At this time, the panel 11 is securely fastened to the supporting members 10 via the fastening devices 20, yet the screws 24 exert no strains upon the respective bosses 12 due to the fact that the shank 25 of each screw 24 projecting into the outer end of the opening 12a and is altogether out of contact therewith. Consequently, the shank 25 of the screw 24 exerts no radially outwardly directed forces upon the boss 12; and overtightening of the screw 24 exerts no thread-stripping forces upon the boss 12, since the thread 26 engages the end wall 23 of the part 21 and not the boss 12.

This arrangement of the assembly is very advantageous, particularly when the panel 11 is molded of hard and brittle plastic material, or when the panel 11 is molded of soft and pliable plastic material. Also, the arrangement accommodates subsequent removal of the panel 11 from the supporting members 10, without damage to the parts 21 or to the bosses 12 carried by the panel 11. Thus, the panel 11 may be readily and quickly placed and removed, if required, with respect to the supporting members 10, without damage to the panel 11, and by the use of a simple screw driver. Also, there is no danger of breaking the bosses 12, even if the screws 24 are overtightened. The arrangement is very advantageous in the assembly of the sections of automobile bodies, wherein a large number of molded plastic elements are incorporated in the dashboard, and in other trimmed parts of the bodies. Of course, the arrangement is also advantageous in the construction of other devices and appliances, such, for example, as home appliances (ranges, refrigerators, etc.). It is further advantageous that the parts 21 may be anchored to the bosses 12 prior to movement of the panel 11 to the scene of assembly thereof with respect to the supporting members 10. Finally, it will be appreciated that the parts 21 are of simple and economical construction and that the self-tapping screws 24 are entirely conventional.

In view of the foregoing it is apparent that there has been provided a fastening device of improved and simplified construction and arrangement.

While there has been described what is at present considered to be the preferred embodiment of the invention, it will be understood that various modifications may be made therein, and it is intended to cover in the appended claim all such modifications as fall within the true spirit and scope of the invention.

What is claimed is:

A device for fastening an element molded of synthetic plastic material to a member, wherein said element includes a boss formed integrally therewith and projecting outwardly therefrom, and wherein said boss has a substantially cylindrical outer surface and an opening extending substantially axially into the outer end thereof; said device comprising a part formed of resilient sheet metal and of generally cup-shaped configuration including a substantially tubular side wall being open at one end and having an end wall at the opposite end thereof, said side wall having at least one slot formed therein and extending from the open end thereof toward said end wall so as to facilitate slipping of said side wall over the outer end of said boss, said side wall surrounding and frictionally engaging the outer surface of said boss with said end wall engaging the outer end of said boss, said side wall carrying a plurality of helically disposed and radially inwardly projecting thread-forming structures, whereby rotation of said side wall in surrounding and frictional engaging relation with the outer surface of said boss causes said structures to thread the outer surface of said boss so as securely to anchor said part to said boss and thus to said element, whereby said side wall subjects said boss to radially inwardly directed forces, said end wall having a hole therein disposed generally in alignment with the outer end of said opening, said hole having a notch extending radially therefrom, whereby said hole may be deformed into a helical configuration, and a metal screw disposed in said hole and in threaded engagement with said end wall, said screw frictionally engaging said member so as securely to anchor said end wall and thus said part to said member, the inner end of said screw projecting into the outer end of said opening, the minimum diameter of said opening being greater than the maximum diameter of said screw, wherein said screw is out of contact with said surrounding boss, whereby said screw subjects said boss to no radially outwardly directed forces.

References Cited by the Examiner
UNITED STATES PATENTS

| | | | |
|---|---|---|---|
| 2,117,775 | 5/1938 | Tinnerman | 85—36 |
| 2,128,040 | 8/1938 | Conners | 85—36 |
| 2,401,202 | 5/1946 | Tinnerman | 151—41.75 |
| 2,582,580 | 1/1952 | Bedford | 85—36 |

CARL W. TOMLIN, *Primary Examiner.*

R. S. BRITTS, *Assistant Examiner.*